(12) United States Patent
Verna et al.

(10) Patent No.: US 8,566,100 B2
(45) Date of Patent: Oct. 22, 2013

(54) AUTOMATED METHOD AND SYSTEM FOR OBTAINING USER-SELECTED REAL-TIME INFORMATION ON A MOBILE COMMUNICATION DEVICE

(75) Inventors: Anthony Verna, Woodland Hills, CA (US); Luis M. Ortiz, Albuquerque, NM (US)

(73) Assignee: Verna IP Holdings, LLC, Albuquerque, NM (US)

( * ) Notice: Subject to any disclaimer, the term of this patent is extended or adjusted under 35 U.S.C. 154(b) by 0 days.

(21) Appl. No.: 13/586,082

(22) Filed: Aug. 15, 2012

(65) Prior Publication Data

US 2012/0330668 A1 Dec. 27, 2012

Related U.S. Application Data

(63) Continuation-in-part of application No. 13/489,990, filed on Jun. 6, 2012.

(60) Provisional application No. 61/499,623, filed on Jun. 21, 2011.

(51) Int. Cl.
*G10L 13/08* (2013.01)
(52) U.S. Cl.
USPC .......................................... 704/260; 707/272
(58) Field of Classification Search
None
See application file for complete search history.

(56) References Cited

U.S. PATENT DOCUMENTS

| | | | |
|---|---|---|---|
| 6,141,642 A * | 10/2000 | Oh | 704/260 |
| 6,778,961 B2 | 8/2004 | Walker et al. | |
| 7,062,437 B2 | 6/2006 | Kovales et al. | |
| 7,885,817 B2 | 2/2011 | Paek et al. | |
| 8,180,645 B2 | 5/2012 | Johnson et al. | |
| 2001/0049602 A1 | 12/2001 | Walker et al. | |
| 2004/0049389 A1 | 3/2004 | Marko et al. | |
| 2007/0260460 A1 | 11/2007 | Hyatt | |
| 2009/0313020 A1 | 12/2009 | Koivunen | |
| 2010/0268539 A1 | 10/2010 | Xu et al. | |
| 2011/0111805 A1 | 5/2011 | Paquier et al. | |
| 2011/0161085 A1 * | 6/2011 | Boda et al. | 704/260 |
| 2011/0207446 A1 * | 8/2011 | Iwuchukwu | 455/414.3 |

* cited by examiner

*Primary Examiner* — Talivaldis Ivars Smits
(74) *Attorney, Agent, or Firm* — Luis M. Ortiz; Kermit D. Lopez; Ortiz & Lopez, PLLC

(57) ABSTRACT

A customized live tile application module can be configured in association with the mobile communication device in order to automatically vocalize the real-time information preselected by a user in a multitude of languages. A text-to-speech application module can be integrated with the customized live tile application module to automatically vocalize the preselected real-time information. The real-time information can be obtained from a tile and/or a website integrated with a remote server and announced after a text to speech conversion process without opening the tile, if the tiles are selected for announcement of information by the device. Such an approach automatically and instantly pushes a vocal alert with respect to the user-selected real-time information on the mobile communication device thereby permitting the user to continue multitasking. Information from tiles can also be rendered on second screens from a mobile device.

20 Claims, 5 Drawing Sheets

AUTOMATED METHOD AND SYSTEM FOR OBTAINING USER-SELECTED REAL-TIME INFORMATION ON A MOBILE COMMUNICATION DEVICE

INVENTION PRIORITY

This patent application claims the benefit of priority under 35 U.S.C. §119 as a Continuation-in-Part of U.S. application Ser. No. 13/489,990, filed Jun. 6, 2012, entitled "Method, System and Processor-Readable Media for Automatically Vocalizing User Pre-Selected Sporting Event Scores", which is a continuation of Provisional Application Ser. No. 61/499,623 entitled "Method, System and Processor-Readable Media for Automatically Vocalizing User Pre-Selected Sporting Event Scores", filed Jun. 21, 2011, which are both herein incorporated by reference in their entirety.

TECHNICAL FIELD

Embodiments are generally related to wireless communications devices and techniques. Embodiments are also related to text-to-speech conversion engine. Embodiments are additionally related to method and system for obtaining user-selected real-time information on a mobile communication device.

BACKGROUND OF THE INVENTION

Mobile communication devices such as, for example, cell phones, smart phones, and personal digital assistants (PDAs) are implemented to provide user access to large amounts of data via the Internet. Such devices include a user interface that displays a menu to access a desired data. Conventional menu structures for mobile communication devices require users to remember a hierarchy of functions and applications to reach the desired information and task. Users can become frustrated when they are unable to locate the desired information and may be unable to fully exploit the advantages of the mobile communication device. Additionally, tracking and managing such information on the mobile communication device can be extremely difficult while performing more than one task at the similar time.

Based on the foregoing, it is believed that a need exists for an improved method and system for obtaining user-selected real-time information on a mobile communication device. A need also exists for automatically vocalizing the real-time information in a multitude of languages without opening a link, as will be described in greater detailed herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide improved wireless communications devices and techniques.

It is another aspect of the disclosed embodiments to provide for an improved method and system for obtaining user-selected, real-time information on a mobile communication device.

It is a further aspect of the disclosed embodiments to provide for an improved method and system for automatically vocalizing the real-time information in a multitude of languages.

The aforementioned aspects and other objectives and advantages can now be achieved as described herein. A method and system for obtaining user-selected real-time information on a mobile communication device is disclosed herein. A customized live tile application module can be configured in association with the mobile communication device in order to automatically vocalize the real-time information preselected by a user in a multitude of languages. A text-to-speech application module (e.g., Cisco, Ivano) can be integrated with the customized live tile application module to automatically vocalize the preselected real-time information (e.g., sports information and location-based services). The real-time information can be obtained from a tile and/or a website integrated with a remote server and announced after a text to speech conversion process without opening the tile, if the tiles are selected for announcement of information by the device. Such an approach automatically and instantly pushes a vocal alert with respect to the user-selected real-time information on the mobile communication device thereby permitting the user to continue multitasking.

The application can be programmed to search the information (e.g., sports scores, stocks, weather, news, etc) from the website and the remote server. Real time information can also be displayed on a double-tile space of the mobile communication device. Multiple tiles can communicate with a parent application so that the information can be transferred to a single tile. The tiles can automatically be updated with new notifications and posses a plethora of information from various applications. The tiles can include, for example, sports information, location-based commercial services, weather, driving directions, local information, travel, and financial information such as stock exchange listing values. The customized live tile application module works on all customer platforms and provides maximum performance with minimal memory and processing footprint and highest speech quality.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
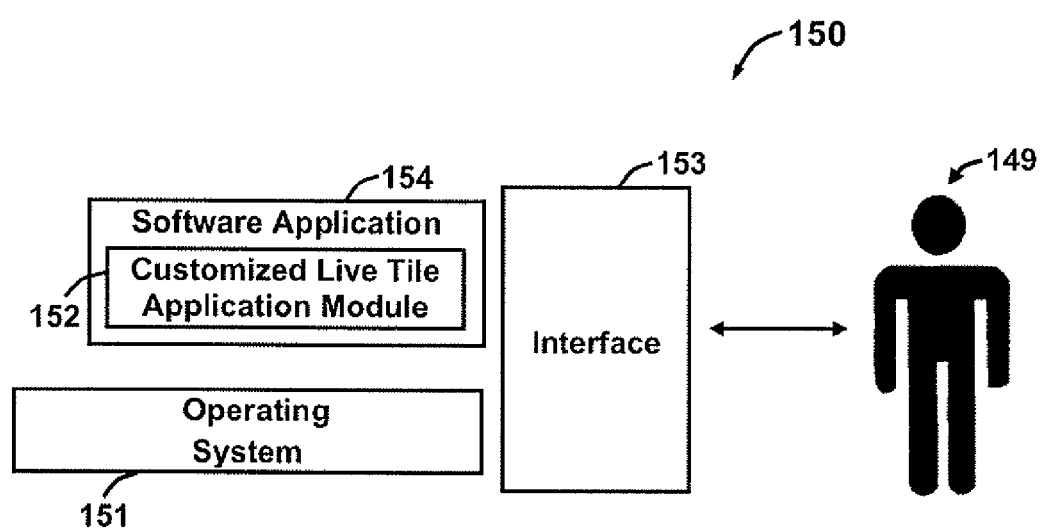
FIG. 1 illustrates a schematic view of a system that includes a customized live tile application module, an operating system and a user interface, in accordance with the disclosed embodiments.

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the present invention can be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages, such as the "C" programming language or in a visually oriented programming environment, such as, for example, Visual Basic.

The invention is described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

Although not required, the disclosed embodiments will be described in the general context of computer-executable instructions, such as program modules, being executed by a single computer. In most instances, a "module" constitutes a software application. Generally, program modules include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

Referring now to FIG. 1, a system 150 is illustrated, which includes a customized live tile application module 152, an operating system 151, a software application 154 and a user interface 153, in accordance with the disclosed embodiments. Note that the customized live tile application module 152 can be stored in a memory of, for example a data-processing apparatus, an electronic device, a mobile communication device and other home and industrial appliances (not shown in FIG. 1). System 150 thus includes a kernel or operating system 151 and a shell or interface 153 and one or more application programs, such as the customized live tile application module 152.

In general, the operating system 151 can be composed of programs (e.g., modules) and data that run on computers or other data-processing devices or systems, and which manages the hardware and provides common services for efficient execution of various application software, such as, for example, the customized live tile application module 152. For hardware functions such as input and output and memory allocation, the operating system 151 can function as an intermediary between application programs and the computer hardware, although in most embodiments, the application code is usually executed directly by the hardware, but will frequently call the operating system 151, or be interrupted by it.

The interface 153, which is preferably a GUI (Graphical User Interface), can serve to display results, whereupon the user 149 may supply additional inputs or terminate a particular session. The customized live tile application module 152 can include instructions, such as those of method 300 discussed herein with respect to FIG. 3. FIG. 1 is thus intended as an example, and not as an architectural limitation of the disclosed embodiments. Such embodiments, however, are not limited to any particular application or any particular computing or data-processing environment. Instead, those skilled in the art will appreciate that the disclosed system and method may be advantageously applied to a variety of system and application software.

Figure 2:
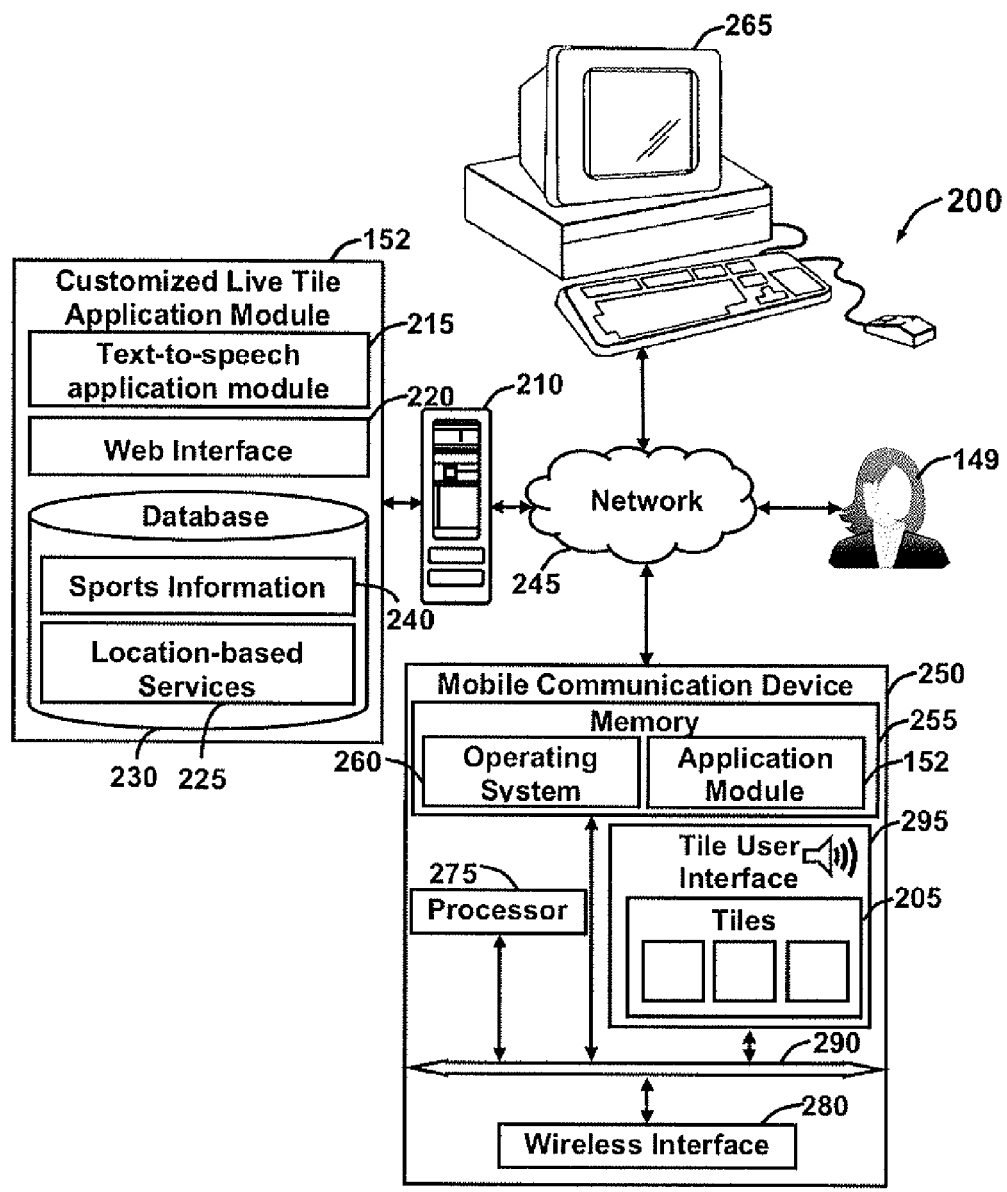
FIG. 2 illustrates a block diagram of a system for obtaining user-selected real-time information on a mobile communication device, in accordance with the disclosed embodiments.

FIG. 2 illustrates a block diagram of a system 200 for obtaining user-selected real-time information 225 and 240 on a mobile communication device 250, in accordance with the disclosed embodiments. Note that in FIGS. 1-4 identical parts or elements are generally indicated by identical reference numerals. The system 200 generally includes a server 210 having the customized live tile application module 152 configured in association with the mobile communication device 250 and a data-processing system 265 via a network 245. The system 200 further includes a text-to-speech application module 215 and a web interface 220. The customized live tile application module 152 automatically vocalizes the real-time information preselected by a user 149 in a multitude of languages.

The text-to-speech application module 215 (e.g., Cisco, Ivano) can be integrated with the customized application module 152 to automatically vocalize the preselected real-time information such as, for example, sports information 240 and location-based services 225. Note that the sports information can be for example, football game information and location-based services can be, for example, weather, driving directions, local info, travel, financial information such as stock exchange listing values. The text-to-speech application module 215 converts normal language text into speech; other systems render symbolic linguistic representations like phonetic transcriptions into speech. The real-time information 240 and 225 can be obtained from a tile 205 and/or a web interface 220 integrated with the remote server 210 and announced after a text to speech conversion without opening the tile 205, if the tiles 205 are selected for announcement of information by the mobile communication device 250.

The remote server 210 can be typically employed to transmit the real-time information 225 and 240 from the tile 205 and/or a web interface 220 integrated with the remote server 210 to the mobile communication device 250. The mobile communication device 250 can be such as, for example, a Smartphone, a personal digital assistant (PDA), and the like which offers a wide range of capabilities. The mobile communication device 250 includes a tile user interface 295, a memory 255 and a processor 275 coupled to a local interface 290. The local interface 290 can be for example, a data bus with an accompanying control/address bus. A wireless interface 280 facilitates wireless communication with the server 210 and other wireless devices and/or networks. The memory 255 stores several modules 151 and 152 that are executable by the processor 275.

Note that the network 245 can be an Internet connection representing a worldwide collection of networks and gateways that uses the Transmission Control Protocol/Internet Protocol (TCP/IP) suite of protocols to communicate with one another and allow mobile devices to communicate with each other. At the heart of the Internet is a backbone of high-speed data communication lines between major nodes or host computers, consisting of thousands of commercial, government, educational and other computer systems that route data and messages. Of course, network also may be implemented as a number of different types of networks such as for example, an intranet, a local area network (LAN), or a wide area network (WAN). Note that the configuration depicted in FIG. 2 is intended as an example, and is not an architectural limitation with respect to different embodiments of the present invention.

The customized live tile application module 152 can be programmed to search the information (e.g., sports scores, stocks, weather, news, etc) from the website 220 and the remote server 210. The synthetically-voiced, real-time information 225 and 240 can be vocalized with more accurate pronunciations and text processing for all languages, more powerful dictionary features, more capable run-time behavior configuration, enhanced mark-up language support, and changes to the core algorithms. The request can be governed by protocols and the real-time information can be tapped from the device 250 and 265 to vocalize the content. A text-to-speech application module 215 and libraries work on all customer platforms and devices at maximum performance, with minimal memory and processing footprint and highest speech quality. Such an approach can automatically and instantly push a vocal alert with respect to the information 225 and 240, thereby permitting the user 149 to continue multitasking. Such an approach can also automatically and instantly generate a vocal alert locally on the mobile device based on pre-selected information, which can be defined in a user profile, with respect to the information 225 and 240, thereby permitting the user 149 to continue multitasking.

The real time information 225 and 240 can also be displayed on a double-tile space 205 of the mobile communication device 250. Multiple tiles 205 can also communicate with a parent application and deep link into the content so that targeted information can be transferred to a single (consolidated) information tile used for information vocalization (announcement) over the mobile phone or a Bluetooth connected speaker (automobile audio system, earpiece, etc.) in communication with the mobile phone. In general, the tile user interface 295 involves a centralized theme, such as an office environment, in which it is desirable to get an overview of multiple applications involving a number of relevant controls and displays of information. From the overview display, the user 149 can select the tile to expand a selected application into additional inter-related tiles that can be designed to display all of any remaining functions of the selected application. The tiles 205 automatically update on new notifications and posses plenty of information from applications without having to open them.

Figure 3:
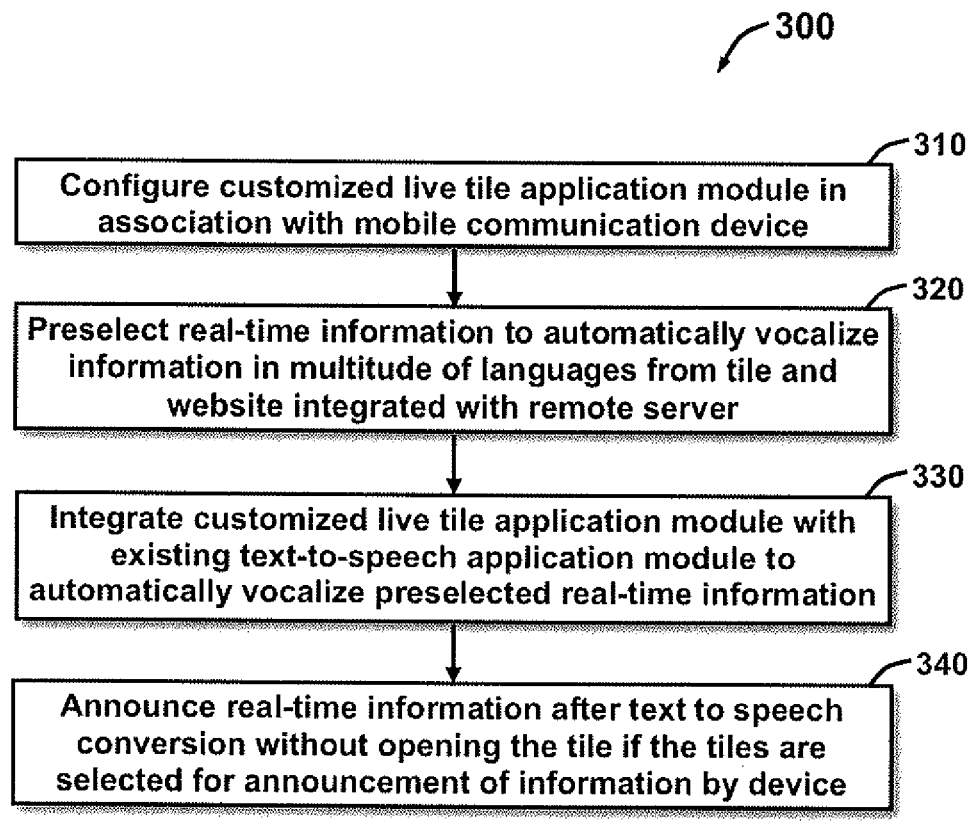
FIG. 3 illustrates a high level flow chart of operations illustrating logical operational steps of a method for obtaining user-selected real-time information on the mobile communication device, in accordance with the disclosed embodiments.

FIG. 3 illustrates a high level flow chart of operations illustrating logical operational steps of a method 300 for obtaining user-selected real-time information 225 and 240 on the mobile communication device 250, in accordance with the disclosed embodiments. Note that the method 300 can be implemented in the context of a computer-useable medium that contains a program product, including, for example, a module or group of modules. The customized live tile application module 152 can be configured in association with the mobile communication device 250, as indicated at block 310.

Next, the real-time information 225 and 240 can be preselected by the user 149 in order to automatically vocalize the information 225 and 240 in multitude of languages from the tile 205 and/or the website 220 integrated with the remote server 210, as depicted at block 320. The customized live tile application module 152 can be integrated with existing text-to-speech application module 215 to automatically vocalize preselected real-time information 225 and 240, as shown at block 330. Thereafter, as indicated at block 340, the real-time information 225 and 240 can be announced after text to speech conversion process without opening the tile 205 if the tiles are selected for announcement of information by device 250.

Figure 4:
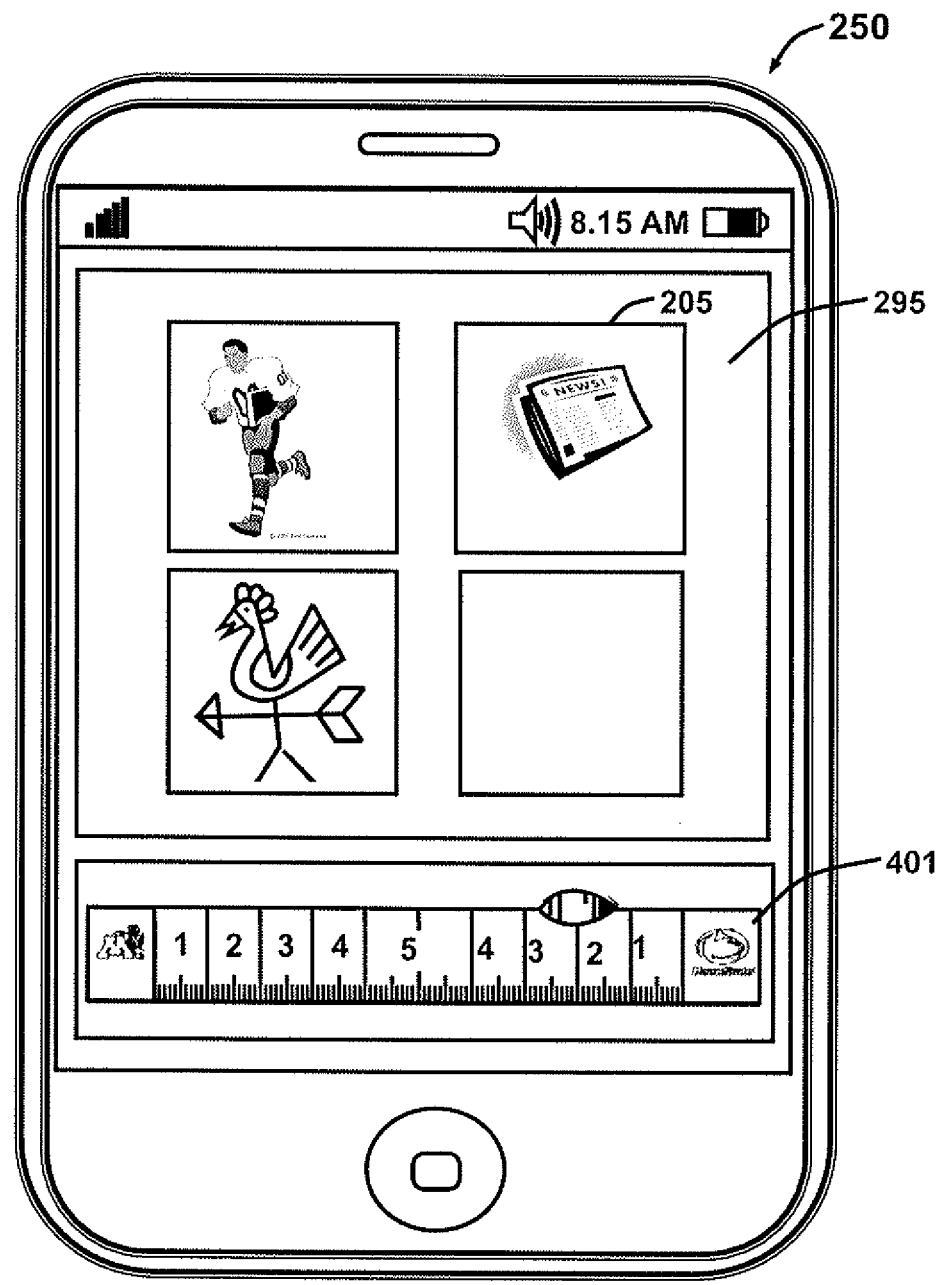
FIG. 4 illustrates a tile user interface of a mobile communication device that includes user-selected real-time information, in accordance with the disclosed embodiments.

FIG. 4 illustrates a tile user interface of the mobile communication device 250 representing the tiles 205 that includes user-selected real-time information 225 and 240, in accordance with the disclosed embodiments. The tile user interface can be implemented via a GUI such as, for example, the interface 153 depicted in FIG. 1 herein, and may be provided by a module, such as, for example, module 152 (e.g., a software application). In the illustrated figures herein, the tile user interface is generally implemented in the context of a GUI "window". Note that in computing, a GUI "window" is generally a visual area containing some type of user interface. Such a "window" usually (but not always) possesses a rectangular shape, and displays the output of and may allow input to one or more processes. Such windows are primarily associated with graphical displays, which can be manipulated with a mouse cursor, a touch screen display or a trackball. The user 149 can interact with the tile user interface to select and operate such options by pointing and clicking with a user input device such as, for example, a touch screen. A particular item can function in the same manner to the user 149 in all applications because the user interface 153 provides standard software routines to handle these elements and reports the user's actions.

The tile user interface displays a list of tiles 205 from which the user 149 may select utilizing various interfaces for example, a touch screen display, a trackball, buttons and the like. The real-time information 225 and 240 associated with the tiles 205 can be preselected by the user 149 in order to automatically vocalize the information 225 and 240 in a multitude of languages. The system 200 provides maximum performance on every device with easy integration and minimal hardware requirements.

Also shown in FIG. 4 is a large tile 401 of an instant football widget, which is an example of a tile that can provide sports game information, such as ball location and score information from, for example, American football games. Incorporated by reference herein is U.S. Pat. No. 7,596,759 issued to Anthony F. Verna on Sep. 29, 2009. A mobile device can be programmed with a large tile to convert information as taught in the '759 patent, but in a large sports-related tile as shown in FIG. 4 so that information can be converted into speech as game information. Information can include ball location on the field and score, and can be vocalized to the user of the mobile device (or via remote speakers via a Bluetooth connection) without distraction.

Figure 5:
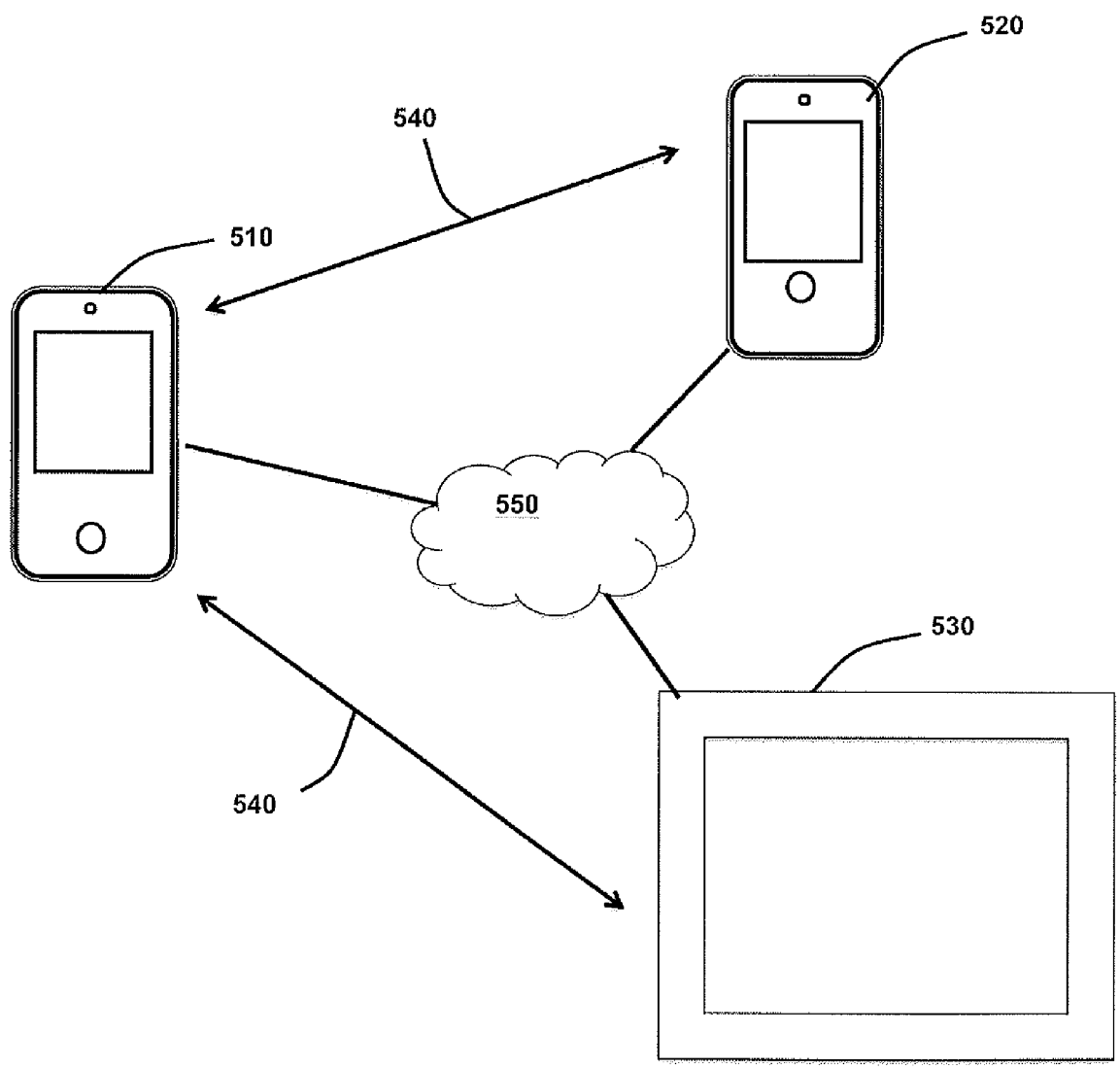
FIG. 5 illustrates a mobile device exchanging a customized tile or tiles, or the concept that customized tiles can be exchanged either directly or over a network.

Referring to FIG. 5, an additional feature is shown where tile information on a mobile device 510 can be shared with other electronic devices such as another mobile device 520 or a flat panel display 530 via short range wireless communication 540 (e.g., Bluetooth) or via a data network 550. So long as the secondary device can be identified by mobile device 510 and connected to, tiles and information can be shared. Sharing is desirable where a pre-programmed tile is desired by a second mobile device user and its transfer is desired from the first mobile device, rather than programming a tile from scratch. Such an expedient method of sharing can be seen as advantageous wherein two avid soccer fans want to share a tile of soccer game information that is converted into Spanish that is already in possession of the first mobile device user. Another scenario of significant value is where a tile owner would like to render the audio or video content from a tile operating on his/her mobile device with a large flat panel display for enjoyment by more than one person. This "second screen" application can be of real value in living rooms or sports bars where large flat panels are available to receive data from a nearby hand held device such as a smartphone.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for obtaining user-selected real-time information on a mobile communication device from a tile displayed on the mobile device and selected by the user, comprising:

configuring a customized live tile application module in association with a first mobile communication device in order to selectively provide real-time information preselected by a user for rendering as at least one of speech to a speaker integrated in the first mobile communication device, speech to a speaker wirelessly connected to the first mobile communication device, images on a flat panel display that is wirelessly connected to the first mobile communication device, images on a second mobile communication device that is wirelessly connected to the first mobile communication device, or speech on the second mobile communication device that is wirelessly connected to the first mobile communication device;

obtaining said real-time information with said first mobile communication device from a live tile displayed on the mobile device and selected by the user by retrieving said real-time tile information from a remote server; and selectively providing at least one of said tile and said tile information for rendering as at least one of speech to a speaker integrated in the first mobile communication device, speech to a speaker wirelessly connected to the first mobile communication device, images on a flat panel display that is wirelessly connected to the first mobile communication device, images on a second mobile communication device that is wirelessly connected to the first mobile communication device, or speech on the second mobile communication device that is wirelessly connected to the first mobile communication device.

2. The method of claim 1, wherein said tile information is provided as at least one of speech to a speaker integrated in the first mobile communication device or speech to a speaker wirelessly connected to the first mobile communication device after a text to speech conversion process in said first mobile communication device without opening said tile if said tile is selected on said first mobile communication device for announcement of said real-time information by said mobile first communication device.

3. The method of claim 1, further comprising automatically and instantly pushing a vocal alert with respect to said real-time information thereby permitting said user to multitask.

4. The method of claim 1 further comprising programming said customized live tile application module to search said real-time information from a website integrated with said remote server.

5. The method of claim 1 further comprising displaying said real time information on a double-tile space of said mobile communication device.

6. The method of claim 1, further comprising communicating information from a plurality of tiles to a parent application so that said real-time information from more than one tile is rendered.

7. The method of claim 1, further comprising automatically updating at least one new notification with respect to said tile wherein said tile provides information from a plurality of applications.

8. The method of claim 1 wherein said tile comprises sports information.

9. The method of claim 1 wherein said tile comprises a location-based service.

10. The method for obtaining user-selected real-time information on a mobile communication device from a tile displayed on the mobile device and selected by the user of claim 1, wherein said tile is an instant football widget tile providing sports game information including ball location and score information as said real-time information.

11. A method for programming a mobile device to obtain user-selected real-time information associated with a tile displayed on the mobile communication device, comprising:
configuring a customized live tile application module in association with a first mobile communication device in order to selectively provide real-time information preselected by a user in a plurality of languages for rendering as at least one of speech to a speaker integrated in the first mobile communication device, speech to a speaker wirelessly connected to the first mobile communication device, images on a flat panel display that is wirelessly connected to the first mobile communication device, images on a second mobile communication device that is wirelessly connected to the first mobile communication device, or speech on the second mobile communication device that is wirelessly connected to the first mobile communication device;
integrating a text-to-speech application module with said customized live tile application module to automatically vocalize said preselected real-time information in a language selected by the user;
obtaining said real-time information with said first mobile communication device from stored information integrated within a remote server associated with real-time information preselected by the user to announce said real-time information after a text to speech conversion process without opening said tile if said tile is selected on said mobile communication device for rendering by the user; and
selectively providing at least one of said tile and said tile information for rendering as at least one of speech to a speaker integrated in the first mobile communication device, speech to a speaker wirelessly connected to the first mobile communication device, images on a flat panel display that is wirelessly connected to the first mobile communication device, images on a second mobile communication device that is wirelessly connected to the first mobile communication device, or speech on the second mobile communication device that is wirelessly connected to the first mobile communication device.

12. The method of claim 11, further comprising automatically and instantly pushing a vocal alert with respect to said real-time information thereby permitting said user to multitask.

13. The method of claim 11 further comprising programming said customized live tile application module to search said real-time information from a website integrated with said remote server.

14. The method of claim 11 further comprising displaying said real time information on a double-tile space of said mobile communication device.

15. The method of claim 11, further comprising communicating information from a plurality of tiles to a parent application so that said real-time information from more than one tile is rendered.

16. The method of claim 11, further comprising automatically updating at least one new notification with respect to said tile wherein said tile provides information from a plurality of applications.

17. The method for programing a mobile device to obtain user-selected real-time information associated with a tile displayed on the mobile communication device of claim 11, wherein said tile is an instant football widget tile providing sports game information including ball location and score information as said real-time information.

18. A mobile device programmed to obtaining user-selected real-time information associated with a tile displayed on the mobile communication device, comprising:
a customized live tile application module provided in association with the mobile communication device and configured to selectively: vocalize real-time information preselected by a user in a plurality of languages to a speaker integrated in the mobile communication device; vocalize real-time information preselected by a user in a plurality of languages to a speaker wirelessly associated with the mobile communication device; or display the real-time information preselected by a user on a flat panel display wirelessly connected to the mobile communication device;
a text-to-speech application module with said customized live tile application module to automatically vocalize said preselected real-time information in a language selected by the user.

19. The mobile device of claim 18, wherein real-time information obtained from a tile information integrated within a remote server is provided to the text-to-speech application module to process the information for the mobile communication device to announce said real-time information after a text to speech conversion process without opening said tile if said tile is selected on said mobile communication device for announcement of said real-time information by said mobile communication device.

20. The mobile device of claim 18, further comprising an instant football widget tile providing sports game information including ball location and score information as said real-time information.

* * * * *